United States Patent
Nakashio

(10) Patent No.: US 11,838,202 B2
(45) Date of Patent: Dec. 5, 2023

(54) MASTER DEVICE AND COMMUNICATION METHOD

(71) Applicant: Mitsubishi Electric Corporation, Tokyo (JP)

(72) Inventor: Yuina Nakashio, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/795,237

(22) PCT Filed: Mar. 13, 2020

(86) PCT No.: PCT/JP2020/011199
§ 371 (c)(1),
(2) Date: Jul. 26, 2022

(87) PCT Pub. No.: WO2021/181682
PCT Pub. Date: Sep. 16, 2021

(65) Prior Publication Data
US 2023/0066623 A1    Mar. 2, 2023

(51) Int. Cl.
*H04L 45/00* (2022.01)
*H04L 12/28* (2006.01)

(52) U.S. Cl.
CPC .............. *H04L 45/20* (2013.01); *H04L 12/28* (2013.01)

(58) Field of Classification Search
CPC ... H04L 12/5601; H04L 67/10; H04L 49/351; H04L 47/10; H04L 49/90; H04L 49/3009;
(Continued)

(56) References Cited

U.S. PATENT DOCUMENTS 9,996,132 B2 * 6/2018 Otomo ................ G06F 1/266
11,251,991 B2 * 2/2022 Kajino ................ H04L 43/065
(Continued)

FOREIGN PATENT DOCUMENTS

JP    2000-298645 A    10/2000
JP    2009-33345 A    2/2009

OTHER PUBLICATIONS

International Search Report and Written Opinion dated Apr. 21, 2020, received for PCT Application PCT/JP2020/011199, filed on Mar. 13, 2020, 8 pages including English Translation.

*Primary Examiner* — Djenane M Bayard
(74) *Attorney, Agent, or Firm* — XSENSUS LLP

(57) ABSTRACT

A master device according to this disclosure which communicates with a plurality of slave devices to share cyclic data includes: a configuration information acquiring unit to acquire a phase difference of each of the slave devices determined based on a number of other slave devices to be relayed when the each slave device communicates with the master device; and a transmission timing determining unit to calculate a hop count from a number of other slave devices to be relayed when the each slave device communicates with the master device or another slave device based on the phase difference acquired by the configuration information acquiring unit and to determine a transmission timing for each slave device to transmit the cyclic data in such a way that communications with a same hop count are performed at a same timing by the plurality of slave devices.

12 Claims, 19 Drawing Sheets

(58) Field of Classification Search
CPC ..... H04L 49/602; H04L 49/901; H04L 69/16; H04L 45/24; H04L 45/245; H04L 69/161; H04L 12/42; H04L 12/4645; H04L 12/467; H04L 49/354; H04L 12/18; H04L 12/46; H04L 43/16; H04L 45/22; H04L 45/742; H04L 49/352; H04L 67/104; H04L 69/14; H04L 49/205; H04L 49/606; H04L 67/60; H04L 12/4625; H04L 12/56; H04L 12/5602; H04L 47/125; H04L 47/2408; H04L 47/2441; H04L 47/2458; H04L 47/43; H04L 49/3081; H04L 2012/562; H04L 45/20; H04L 49/109; H04L 49/9047; H04L 49/9073; H04L 2012/5667; H04L 41/0816; H04L 45/00; H04L 45/42; H04L 47/50; H04L 47/623; H04L 49/201; H04L 49/254; H04L 25/03834; H04L 25/03866; H04L 25/062; H04L 25/4908; H04L 27/0014; H04L 27/142; H04L 27/2273; H04L 27/2613; H04L 27/26134; H04L 27/2639; H04L 27/2647; H04L 27/2666; H04L 27/2675; H04L 27/2697; H04L 27/32; H04L 27/34; H04L 27/36; H04L 27/362; H04L 41/0631; H04L 41/0859; H04L 41/0863; H04L 41/0866; H04L 41/0895; H04L 41/12; H04L 41/142; H04W 24/08; H04W 16/14; H04W 4/029; H04W 64/006; H04W 24/10; H04W 72/0453; H04W 4/80; H04W 4/38; H04W 64/00; H04W 4/023; H04W 4/70; H04W 72/0446; H04W 72/51; H04W 4/025; H04W 4/40; H04W 72/541; H04W 12/06; H04W 48/16; H04W 56/001; H04W 12/67; H04W 24/02; H04W 72/0473; H04W 24/04; H04W 12/08; H04W 12/122; H04W 8/18; H04W 84/12; H04W 4/35; H04W 84/18; H04W 12/03; H04W 12/037; H04W 12/50; H04B 17/318; H04B 17/309; H04B 17/23; H04B 17/27; H04B 17/26; H04B 17/29; H04B 17/3911; H04B 17/345; H04B 17/40; H04B 17/20; H04B 7/0413; H04B 5/0037; H04B 17/24; H04B 1/401; H04B 7/0691; H04B 1/0458; H04B 5/0031; H04B 17/14; H04B 7/10; H04B 1/707; H04B 1/7073; H04B 7/0669; H04B 7/15; H04B 7/024; H04B 1/713; H04B 17/101; H04B 17/19; H04B 17/336; H04B 3/542; H04B 3/56; H04B 5/0093; H04B 7/0617; H04B 1/0053; H04B 1/06; H04B 1/16; H04B 1/40; H04B 11/00; H04B 2203/5487; H04B 3/58; H04B 10/80

See application file for complete search history.

(56) References Cited

U.S. PATENT DOCUMENTS

2010/0329125 A1* 12/2010 Roberts .................. H04L 41/12 370/503
2013/0072181 A1* 3/2013 Hashimoto ............. H04W 4/06 455/422.1

* cited by examiner

FIG. 2

| Device Name | Identification information |
|---|---|
| Master device 100 | M |
| Slave device 200a | S1 |
| Slave device 200b | S2 |
| Slave device 200c | S3 |
| Slave device 200d | S4 |
| Slave device 200e | S5 |

FIG. 10

| Identification information of transmission source device | Identification information of transmission destination device | Hop counts of transmission source device from master device |
|---|---|---|
| M | S1 | 0 |
| S1 | S2 | 1 |
| S2 | S3 | 2 |
| S3 | S4 | 3 |
| S4 | S5 | 4 |

FIG. 11

| Identification information of transmission source device | Identification information of transmission destination device | Hop counts of transmission source device from master device |
|---|---|---|
| S1 | M | 1 |
| S2 | M | 2 |
| S3 | M | 3 |
| S4 | M | 4 |
| S5 | M | 5 |

FIG. 12

| Device Name | Identification information | Hop counts from master device | Phase difference |
|---|---|---|---|
| Master device 100 | M | 0 | 0 |
| Slave device 200a | S1 | 1 | 1 |
| Slave device 200b | S2 | 2 | 2 |
| Slave device 200c | S3 | 3 | 3 |
| Slave device 200d | S4 | 4 | 4 |
| Slave device 200e | S5 | 5 | 5 |

FIG. 14

| Hop counts of communication | Phase difference of transmission source device | Remainder of phase difference divided by hop counts | Transmission timing |
|---|---|---|---|
| 1 | 0 | 0 | $T_1$ |
| 1 | 1 | 0 | $T_1$ |
| 1 | 2 | 0 | $T_1$ |
| 1 | 3 | 0 | $T_1$ |
| 1 | 4 | 0 | $T_1$ |
| 1 | 5 | 0 | $T_1$ |
| 2 | 0 | 0 | $T_2$ |
| 2 | 1 | 1 | $T_3$ |
| 2 | 2 | 0 | $T_2$ |
| 2 | 3 | 1 | $T_3$ |
| 2 | 4 | 0 | $T_2$ |
| 2 | 5 | 1 | $T_3$ |
| 3 | 0 | 0 | $T_4$ |
| 3 | 1 | 1 | $T_5$ |
| 3 | 2 | 2 | $T_6$ |
| 3 | 3 | 0 | $T_4$ |
| 3 | 4 | 1 | $T_5$ |
| 3 | 5 | 2 | $T_6$ |
| 4 | 0 | 0 | $T_7$ |
| 4 | 1 | 1 | $T_8$ |
| 4 | 4 | 0 | $T_7$ |
| 4 | 5 | 1 | $T_8$ |
| 5 | 0 | 0 | $T_9$ |
| 5 | 5 | 0 | $T_9$ |

FIG. 15

| Identification information of transmission source device | Transmission timing | Identification information of transmission destination device |
|---|---|---|
| S1 | $T_1$ | M,S2 |
| S1 | $T_3$ | S3 |
| S1 | $T_5$ | S4 |
| S1 | $T_8$ | S5 |
| S2 | $T_1$ | S1,S3 |
| S2 | $T_2$ | M,S4 |
| S2 | $T_6$ | S5 |
| S3 | $T_1$ | S2,S4 |
| S3 | $T_3$ | S1,S5 |
| S4 | $T_1$ | S3,S5 |
| S4 | $T_2$ | S2 |
| S4 | $T_5$ | S1 |
| S5 | $T_1$ | S4 |
| S5 | $T_3$ | S3 |
| S5 | $T_6$ | S2 |
| S5 | $T_8$ | S1 |
| S5 | $T_9$ | M |

MASTER DEVICE AND COMMUNICATION METHOD

CROSS-REFERENCE TO RELATED APPLICATION

The present application is based on PCT filing PCT/JP2020/011199, filed Mar. 13, 2020, the entire contents of which are incorporated herein by reference.

TECHNICAL FIELD

This disclosure relates to a master device and a communication method of a network system including the master device and a plurality of slave devices.

BACKGROUND TECHNOLOGY

Conventionally, technologies have been proposed to improve the communication efficiency in a network system including a plurality of communication devices.

For example, Patent Document 1 describes a method to improve the communication efficiency during cyclic communication in a network system made up of a plurality of nodes including a root node. The cyclic communication means communication in which the devices in a network system repeatedly transmits and receives information during communication cycles with a predetermined time length. In Patent Document 1, the root node performs the cyclic communication with the plurality of nodes via a line for communicating with a node that is directly connected to the root node. The root node performs further communication by using this line when it is unused during the communication cycle. As a result, the line usage rate is improved, and the communication efficiency of the network system is improved.

PRIOR ART LITERATURE

Patent Document

[Patent Document 1] Japanese Unexamined Patent Application Publication No. 2000-298645

SUMMARY OF THE INVENTION

Problems to be Solved by the Invention

Patent document 1 improves the line usage rate of the line, among the lines in the network system, used for communication with the node directly connected to the root node. However, the line usage rates of the lines used for communication between the other nodes are not considered. Therefore, when the root node communicates with one node, the lines connecting the other nodes may not be used for communication. This leads to a poor communication efficiency for the entire network system.

This disclosure is made to solve the above problem. The object is to obtain a master device and a communication method that can improve the communication efficiency of a network system as a whole which includes a master device and a plurality of slave devices.

Means to Solve the Problem

A master device according to this disclosure which is connected with a plurality of slave devices by communication cables and is included in a network system to communicate while sharing cyclic data includes: a configuration information acquiring unit to acquire a phase difference of each of the slave devices determined based on a number of other slave devices to be relayed when the each slave device communicates with the master device; and a transmission timing determining unit to calculate a hop count from a number of other slave devices to be relayed when the each slave device communicates with the master device or another slave device based on the phase difference acquired by the configuration information acquiring unit and to determine a transmission timing for each slave device to transmit the cyclic data in such a way that communications with a same hop count are performed at a same timing by the plurality of slave devices using the communication cables each connecting different pairs of the slave devices.

Effect of the Invention

With the master device and the communication method according to this disclosure, the communication efficiency of an entire network system can be improved.

BRIEF DESCRIPTION OF THE DRAWINGS

FIG. 2 is a table showing the correspondence between device names and identification information in Embodiment 1.

FIG. 10 is an explanatory drawing showing the information contained in a configuration information request frame of Embodiment 1.

FIG. 11 is an explanatory drawing showing the information contained in a configuration information response frame of Embodiment 1.

FIG. 12 is an explanatory drawing showing the configuration information acquired by the master device according to Embodiment 1.

FIG. 14 is a diagram illustrating the determination method of transmission timing according to Embodiment 1.

FIG. 15 is a diagram showing the contents of setting information according to Embodiment 1.

MODE FOR CARRYING OUT THE INVENTION

Embodiment 1

Figure 1:
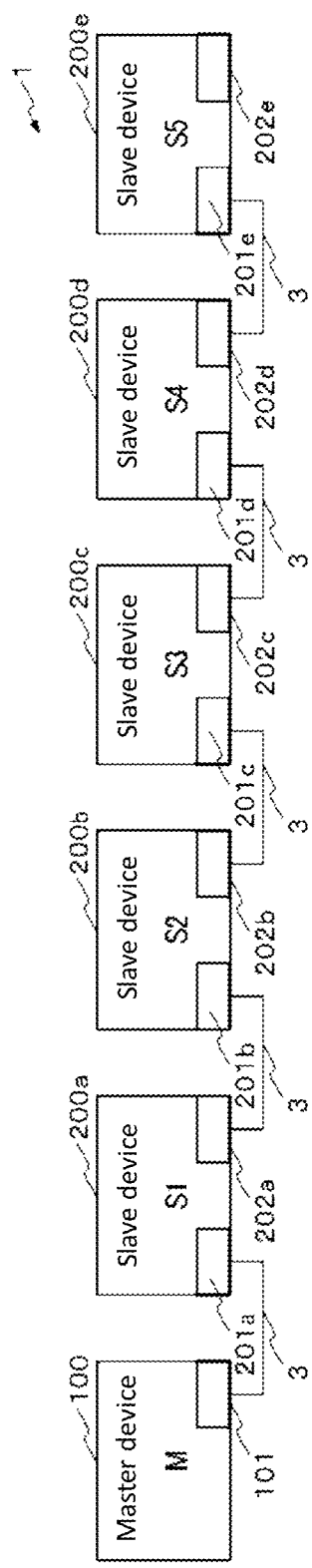
FIG. 1 is a diagram showing a configuration of a network system according to Embodiment 1.

Hereinafter, Embodiment 1 of this disclosure will be described. FIG. 1 is a diagram of a network system 1 according to Embodiment 1 of this disclosure.

The network system 1 includes a plurality of communication devices, namely, one master device 100 and five slave devices 200a to 200e in Embodiment 1. The five slave devices may be collectively referred to as slave devices 200. In the network system 1, the master device 100 and the slave devices 200a to 200e communicate with each other during cyclic communication to share cyclic data. The cyclic data is information that the master device 100 and the slave devices 200a to 200e repeatedly transmit in each communication cycle during the cyclic communication operation. For example, the cyclic data includes instruction information transmitted from the master device 100 to the slave devices 200. The slave devices 200 control external devices based on this instruction information. The cyclic data also includes output values from sensors collected by the slave devices 200. The output values are transmitted from the slave devices 200 to the master device 100. In the network system 1, all of its communication devices communicate with all other communication devices therein within one communication cycle to share the cyclic data.

The master device 100 and the slave devices 200a to 200e are wired in a line-shaped connection by communication cables 3. The slave devices 200 are connected to the master device 100 in the line-shaped connection, namely in the order of their proximity to the master device 100: a slave device 200a, a slave device 200b, a slave device 200c, a slave device 200d, and a slave device 200e. In the network system 1 of line-shaped connection, the master device 100 located at one end is connected to the slave device 200a; the slave device 200e located at the other end is connected to the slave device 200d. In FIG. 1, the symbols M, S1 to S5 attached to each device indicate identification information of each device. The identification information, which is uniquely set for all the devices constituting the network system 1, is used for identifying the master device 100 and the slave devices 200.

FIG. 2 is a table showing the correspondence between device names and the identification information in Embodiment 1 of this disclosure. As shown in FIG. 2, the identification information of the master device 100 is M; the identification information of the slave device 200a is S1; the identification information of the slave device 200b is S2; the identification information of the slave device 200c is S3, the identification information of the slave device 200d is S4; and the identification information of the slave device 200e is S5. In the examples of this disclosure, the identification information is shown as M, S1 to S5. However, the identification information can be other numbers or character strings, as long as each device can be identified thereby. For the identification information, the MAC address of each device or the names of the devices set by the user in advance may be used.

The master device 100 includes at least one communication port 101, which is the interface to which a communication cable 3 is connected. A specific example of the communication port 101 is a LAN port, a USB port, or the like. The master device 100 communicates with the slave devices 200a to 200e via the communication cables 3, to acquire the configuration information required to communicate with the slave devices 200a to 200e, to set transmission timings to perform the cyclic communication, and thus to share the cyclic data with the slave devices 200 during the cyclic communication.

Each of the slave devices 200 has two or more communication ports. In the Embodiment 1, the slave devices 200a to 200e have two communication ports 201 and 202, individually. In each of the slave devices 200a to 200e, the communication port connected to the device on the master side being closer to the master device 100 is shown as communication ports 201a to 201e, and the communication port connected to the device on the end side being closer to the slave device 200e at the end of the line connection is shown as communication ports 202a to 202e.

The slave devices 200a to 200e are controlled by the master device 100. After the master device 100 sets the transmission timings for the cyclic data, the master device 100 and the other slave devices 200 perform the cyclic communication to share the cyclic data.

Note that FIG. 1 illustrates the network system 1 that includes five slave devices 200. However, the communication method according to this disclosure is applicable to a network system that includes two or more slave devices 200.

Figure 3:
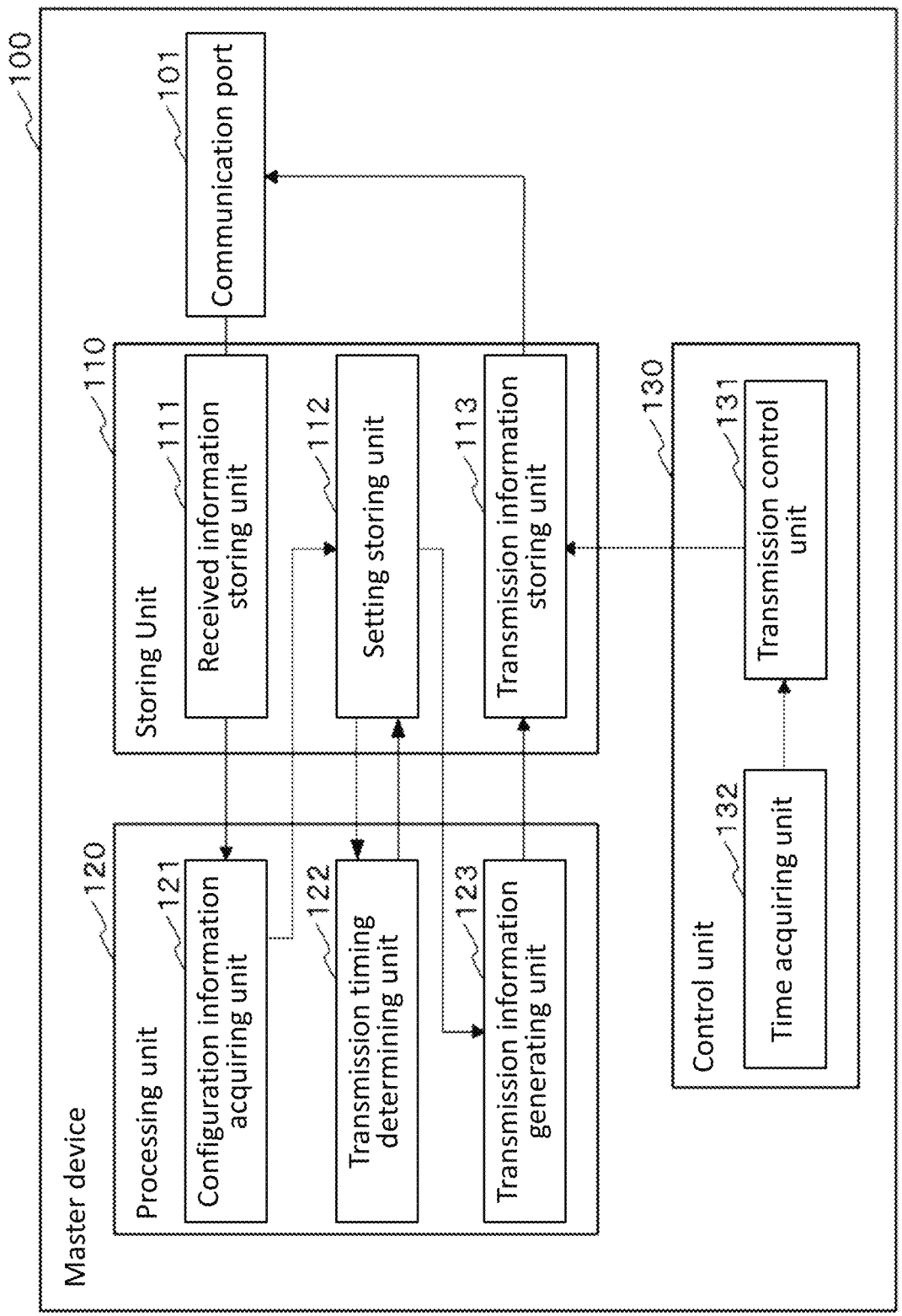
FIG. 3 is a functional block diagram of a master device according to Embodiment 1.

Next, the detailed configuration of the master device 100 will be described with reference to FIG. 3. FIG. 3 shows a functional block diagram of the master device 100 according to Embodiment 1. The master device 100 includes a storing unit 110, a processing unit 120, and a control unit 130 in addition to the communication port 101 described above. The details of each unit will be described below.

First, the storing unit 110 will be described. The storing unit 110 is a device for storing information. The storing unit 110 includes a received information storing unit 111, a setting storing unit 112, and a transmission information storing unit 113.

The received information storing unit 111 stores information acquired by the master device 100 from the slave devices 200 via the communication port 101. This information includes, for example, information of configuration information response frames acquired by the master device 100 from the slave devices 200 during the configuration information acquisition and also information of the cyclic data acquired by the master device 100 from the slave devices 200 during the cyclic communication. The configuration information response frames include the information that the master device 100 acquires from the slave devices 200 included in the network system 1 in order to detect the configuration of the network system 1. The configuration information response frames include information about the slave devices 200.

The setting storing unit 112 stores, as the setting information, the configuration information of the network system 1 acquired by a configuration information acquiring unit 121, to be described later, and the transmission timing of each of the slave devices 200 determined by a transmission timing determining unit 122, to be described later. The setting storing unit 112 may store the user settings on the transmission timing of the cyclic data in the cyclic communication or information such as the communication time required for the transmission timing determining unit 122 to determine the transmission timing, in addition to the configuration information and the transmission timing, which are the setting information.

The transmission information storing unit 113 stores information generated by a transmission information generating unit 123 to be described later, to be transmitted from the master device 100 to the slave devices 200 until a transmission control unit 131 to be described later instructs to transmit the information. The information to be transmitted from the master device 100 to the slave devices 200 includes, for example, information of configuration information request frame to be transmitted during the configuration information acquisition, the setting information to be transmitted during communication setting, and the cyclic data acquired from the slave devices 200 during the cyclic communication. The configuration information request frames include the information that the master device 100 transmits to the slave devices 200 in the network system 1 in order to detect the configuration of the network system 1. The configuration information request frames include the information to cause the slave devices 200 to transmit the information of the configuration information response frames.

Next, the processing unit 120 will be described. The processing unit 120 includes the configuration information acquiring unit 121, the transmission timing determining unit 122, and the transmission information generating unit 123.

The configuration information acquiring unit 121 acquires the configuration information of the slave devices 200 from the information of the configuration information response frames stored in the received information storing unit 111 during the configuration information acquiring operation. The configuration information is the information for the master device 100 to set the transmission timing of the cyclic data to be transmitted during the cyclic communication and includes a phase difference, which is the hop count for each slave device 200 to communicate with the master device 100.

The hop count is a number determined depending on the number of slave devices 200 to be relayed when communication is performed between the master device 100 and a slave device 200 or between the slave devices 200. When the master device 100 or a slave device 200 communicates with its adjacent device, which may be the master device 100 or a slave device 200, the hop count for this communication is one. For each increase in the number of master device 100 or the slave devices 200 that are relayed in the communication, the hop count for that communication also increases by one.

For example, when the master device 100 communicates with the slave device 200a, which are adjacent to each other, the hop count for this communication is counted as one. When the master device 100 communicates with the slave device 200b, the hop count for this communication is counted as two because the number of slave devices 200 to be relayed is increased by one from the communication between adjacent devices.

The phase difference is the hop count determined depending on the number of slave devices to be relayed when a device communicates with a reference device in the network system 1. The phase difference of the reference device itself is set to zero. In the Embodiment 1, the reference device is the master device 100, so that the phase difference of the master device 100 is zero. The phase difference of the slave device 200a is one, because it is the hop count determined depending on the number of slave devices 200 to be relayed when the slave device 200a is communicating with the master device 100. Similarly, the phase difference of the slave device 200b is two, the phase difference of the slave device 200c is three, the phase difference of the slave device 200d is four, and the phase difference of the slave device 200e is five.

The transmission timing determining unit 122 determines the transmission timing of the cyclic data for the master device 100 and each of the slave devices 200 by using the identification information and the phase difference information for each of the slave devices 200 included in the configuration information acquired by the configuration information acquiring unit 121. Here, the transmission timing refers to the timing for a transmission source device to transmit the cyclic data to a transmission destination device. The transmission timing determining unit 122 determines the transmission timing of the cyclic data for each of the slave devices 200 so that the communication of the same hop count will be performed at the same timing between a plurality of devices. The transmission timing may be determined as elapsed microseconds in each cyclic communication or as a specific clock time. The determination method of the transmission timing will be described later.

On the basis of the setting information stored in the setting storing unit 112, the transmission information generating unit 123 generates the information of the configuration information request frame to be transmitted from the master device 100 to each of the slave devices 200 or the cyclic data to be transmitted from the master device 100 to the slave devices 200 during the cyclic communication and stores them in the transmission information storing unit 113.

Next, the control unit 130 will be described. The control unit 130 includes a transmission control unit 131 and a time acquiring unit 132. In addition to these, the control unit 130 may have a function for the master device 100 to perform necessary controls.

The transmission control unit 131 acquires the time information from the time acquiring unit 132 and controls the transmission information storing unit 113 so that the information to be transmitted by the master device 100 will be transmitted from the communication port 101 at the time when it should be transmitted.

The time acquiring unit 132 acquires the time information from a clock (not shown) of the master device 100; the master device 100 and the slave devices 200 are synchronized with the clock in order to perform communication with the time-sharing method during the cyclic communication. In the communication of the network system 1 using the time-sharing method for cyclic communication, the transmission and reception of the cyclic data are performed by specifying in advance the time slots within one cycle and the communication that takes place in the respective slots.

Figure 4:
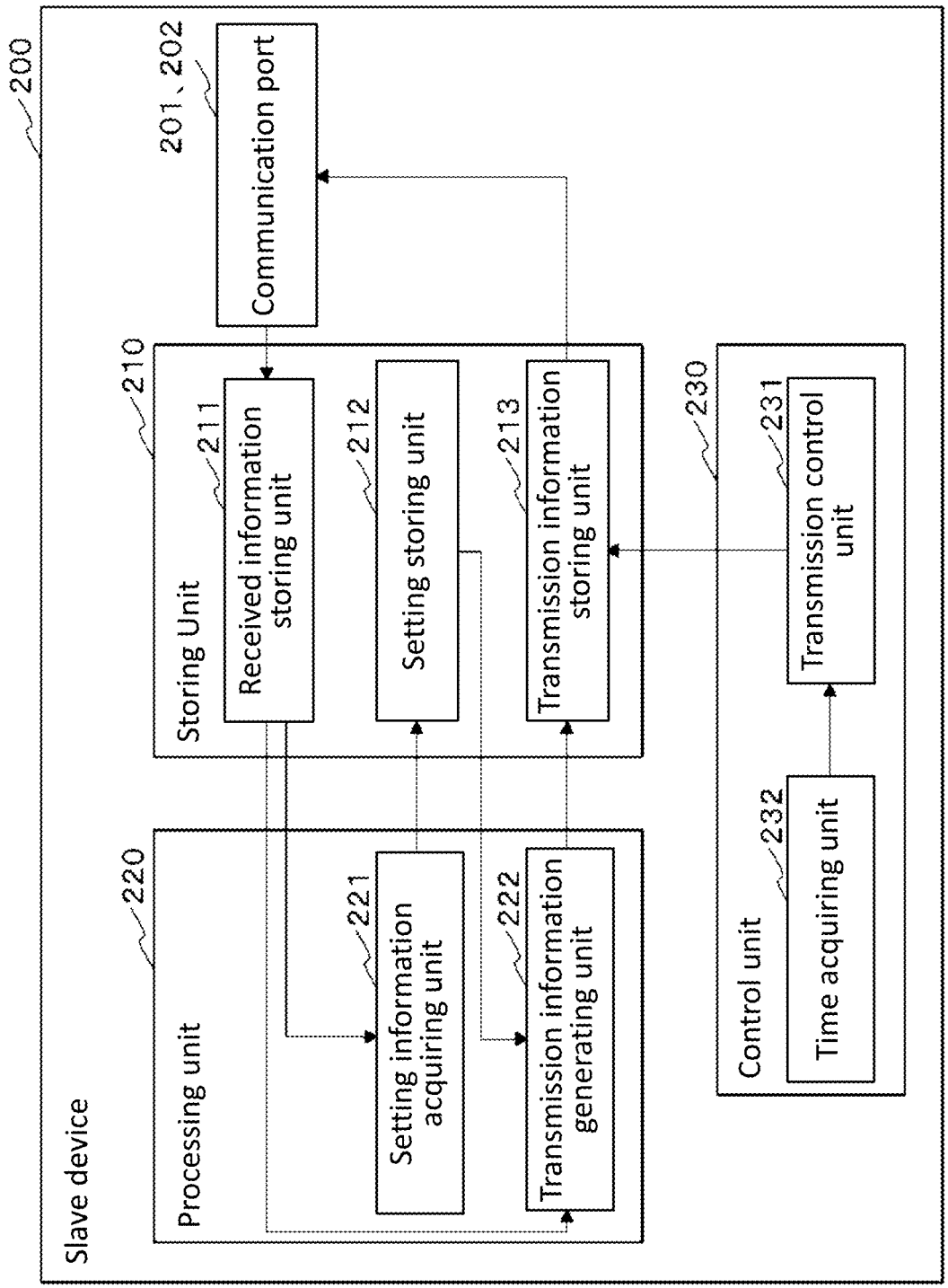
FIG. 4 is a functional block diagram of a slave device according to Embodiment 1.

Next, the detailed configuration of the slave devices 200 will be described with reference to FIG. 4. FIG. 4 is a functional block diagram of a slave device 200 according to Embodiment 1 of this disclosure. Each slave device 200 includes a storing unit 210, a processing unit 220, and a control unit 230 in addition to the communication ports 201 and 202 described above.

First, the storing unit 210 will be described. The storing unit 210 stores the information to be transmitted and received, as well as the settings for communication. The storing unit 210 is a device that stores information, the device corresponding to working memory or the like. The storing unit 210 includes a received information storing unit 211, a setting storing unit 212, and a transmission information storing unit 213.

The received information storing unit 211 stores the information that the slave device 200 acquires from the master device 100 and other slave devices 200 via the communication ports 201 or 202. This information includes, for example, the information of the configuration information request frame acquired during the configuration information acquisition, the setting information acquired from the master device 100 during the communication setting, and the information of the cyclic data acquired from the master device 100 and other slave devices 200 during the cyclic communication.

The setting storing unit 212 stores the setting information acquired by a setting information acquiring unit 221 to be described later, the setting information including the transmission timings of the cyclic data for the cyclic communication and transmitted from the master device 100.

The transmission information storing unit 213 stores the information to be transmitted from the slave device 200. This information includes, for example, the information of the configuration information response frame to be transmitted to the master device 100 during the configuration information acquisition, and the information of the cyclic data to be transmitted during the cyclic communication.

Next, the processing unit 220 will be described. The processing unit 220 includes the setting information acquiring unit 221 and a transmission information generating unit 222.

The setting information acquiring unit 221 acquires the setting information of the transmission timing of the cyclic data from the setting information received from the master device 100 during the communication setting operation out of the received information stored in the received information storing unit 211.

The transmission information generating unit 222 generates the information of, but not limited to, the configuration information response frame to be transmitted from the slave device 200 to the master device 100 or other slave devices 200 and stores the information in the transmission information storing unit 213.

Next, the control unit 230 will be described. The control unit 230 includes a transmission control unit 231 and a time acquiring unit 232.

The transmission control unit 231 acquires the time information from the time acquiring unit 232 and controls the transmission information storing unit 213 in such a way that the information stored in the transmission information storing unit 213 to be transmitted to other devices is transmitted from the communication port 201 on the master side or the communication port 202 on the end side at the time when it should be transmitted. As for the communication port to be used for the transmission, the transmission control unit 231 controls the transmission information storing unit 213 in such a way that the information to be transmitted is transmitted to the device being the transmission destination of the information from the port that is linked to the destination out of the two ports: the communication port 201 on the master side and the communication port 202 on the end side.

The time acquiring unit 232 acquires the time information from the clock with which the master device 100 and the slave devices 200 are synchronized in order to perform communication with the time-sharing method during the cyclic communication.

Figure 5:
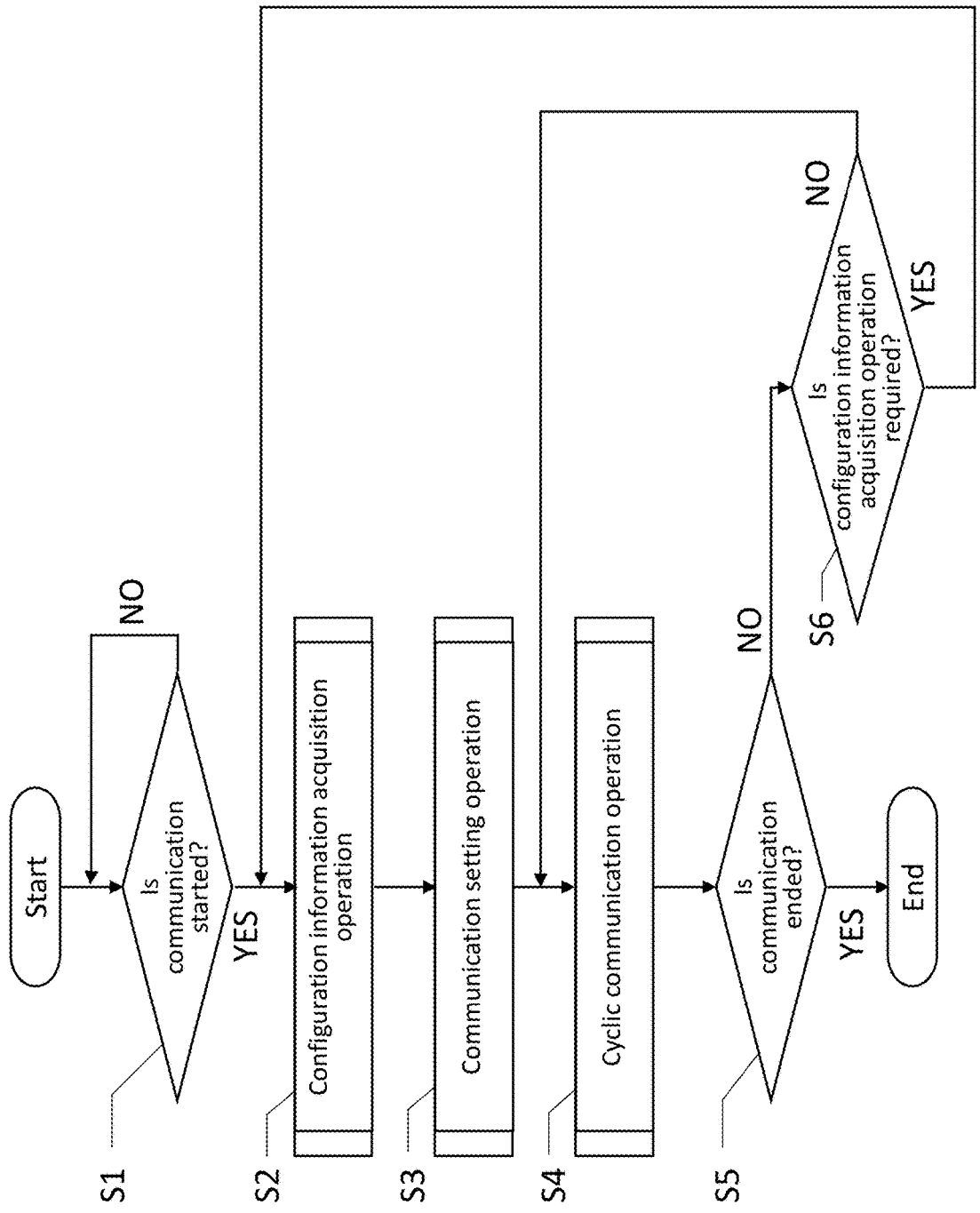
FIG. 5 is a flowchart showing the outline of the operation of the network system in Embodiment 1.

Next, the operation of the network system 1 according to Embodiment 1 will be described with reference to FIG. 5. FIG. 5 is a flowchart showing the outline of the operation of the network system 1 in Embodiment 1.

When the network system 1 starts its operation, the flow shown in FIG. 5 is started. First, the master device 100 determines whether an instruction to start communication is given in Step S1. The network system 1 repeats Step S1 until the instruction to start communication is given. This instruction to start communication is given, for example, by the user to the master device 100.

When it is determined in Step S1 that the instruction to start communication is given, the flow proceeds to Step S2, where the master device 100 starts a configuration information acquiring operation.

Figure 6:
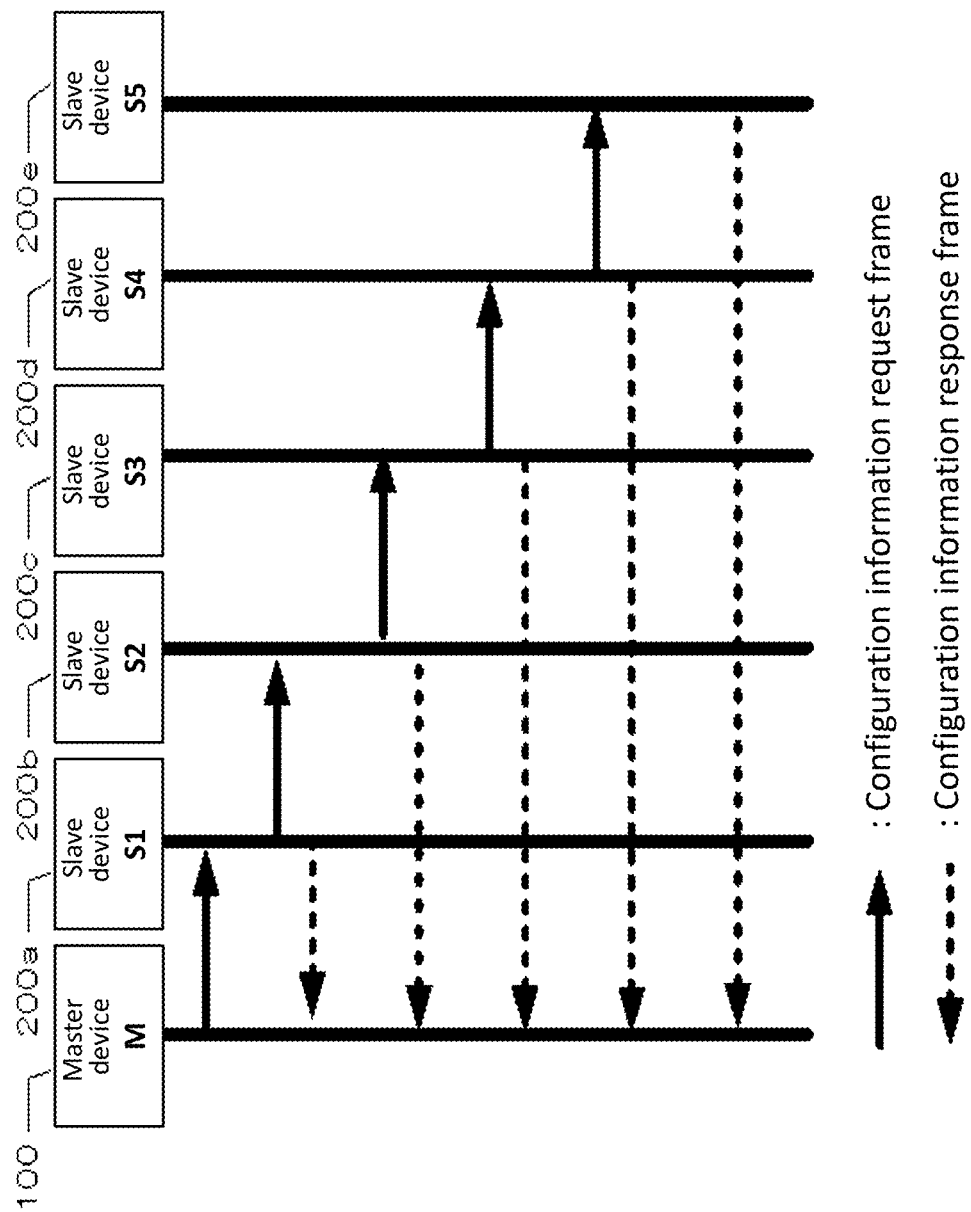
FIG. 6 is a sequence diagram showing the communication for acquiring configuration information according to Embodiment 1.

Here, the configuration information acquiring operation of the network system 1 will be described. FIG. 6 is a sequence diagram showing the communications for acquiring configuration information according to Embodiment 1. In FIG. 6, the communications performed during the configuration information acquiring operation are shown by arrows in chronological order from top to bottom. The tail of an arrow shows the device that transmits information during the communication, and the head of an arrow shows the device that receives information during the communication. The same is true for the arrows in the sequence diagrams shown below.

In FIG. 6, the solid arrows show the communications for the configuration information request frames, and the dotted arrows show the communications for the configuration information response frames.

In the configuration information acquiring operation, the master device 100 first transmits to the slave device 200a the configuration information request frame to request the configuration information necessary for the communication with the slave devices 200 from the communication port 101.

Upon receiving the configuration information request frame, the slave device 200a updates the information of the configuration information request frame and transmits the updated configuration information request frame to the slave device 200b. Then, the slave device 200a transmits the configuration information response frame to the master device 100.

Thereafter, the slave devices 200b through 200d perform the same operation upon receiving the configuration information request frame. Upon receiving the configuration information request frame, the slave device 200e transmits the configuration information response frame to the master device 100 without transmitting the configuration information request frame because the slave device 200e is the device located at the end of the network system 1.

Through the above operation, all the slave devices 200a through 200e constituting the network system 1 transmit the configuration information response frames to the master device 100, where the configuration information acquiring operation of the network system 1 is completed.

When the configuration information acquisition is completed in Step S2, the flow proceeds to Step S3, and the network system 1 performs the communication setting operation.

Figure 7:
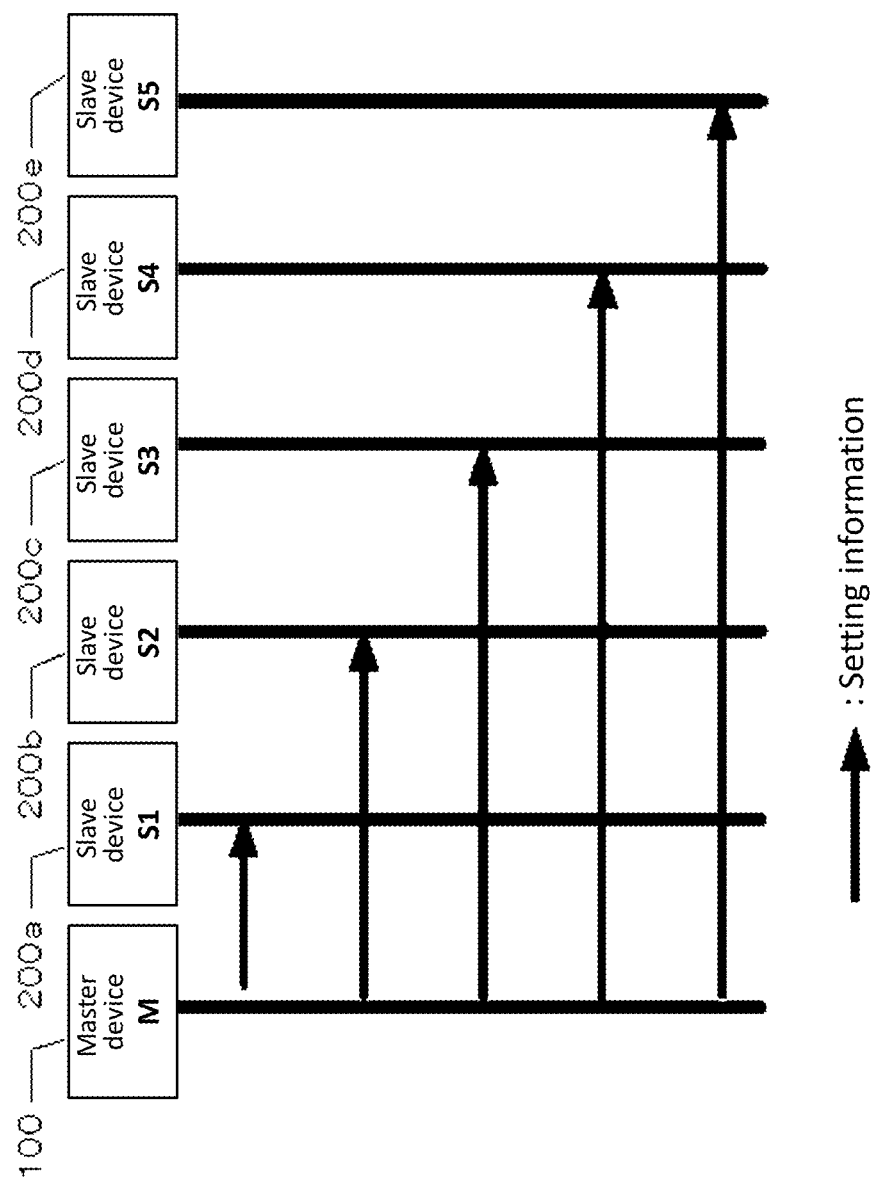
FIG. 7 is a sequence diagram showing the communication for communication setting according to Embodiment 1.

Here, the communication setting operation of the network system 1 will be described. FIG. 7 is a sequence diagram showing the communication for communication setting according to Embodiment 1 in the network system 1 with the same configuration as in FIG. 1. In FIG. 7, the communications between the devices are shown by arrows in chronological order from top to bottom. In FIG. 7, the solid arrows show the communications for the setting information. In the communication setting operation, the master device 100 first determines the transmission timing of the cyclic data of each of the slave devices 200 based on the phase difference and the hop count. The determination method of the transmission timing will be described later. Then, the master device 100 transmits the setting information including the transmission timings of the cyclic data to the slave device 200a. Upon receiving the setting information, the slave device 200a performs the communication setting to itself. The communication setting performed by each slave device 200 is an operation in which each slave device 200 stores, in its setting storing unit 212, information indicating to which device the slave device 200 transmits the cyclic data in which time slot within one cycle. Then, the master device 100 transmits the setting information to the slave devices 200b to 200e in the same way. The slave devices 200b through 200e also each perform the communication setting to itself in the same way as the slave device 200a does.

After Step S3 of FIG. 5, the flow proceeds to Step S4, where the cyclic communication operation of the master device 100 and the slave devices 200 is started.

The cyclic communication operation refers to a repetitive communication operation performed in the network system 1 repeating the cyclic communication, and it is a communication operation that the network system 1 mainly performs. For example, the master device 100 transmits instruction information to the slave devices 200 as cyclic data, and the slave devices 200 control the sensors and other devices to be monitored based on this instruction information. Also, each of the slave devices 200 transmits to the master device 100 and the other slave devices 200 the values obtained from the monitored devices such as sensors connected to the slave device 200 as cyclic data.

After the cyclic communication is completed in Step S4, the flow proceeds to Step S5, where the master device 100 determines whether to end the communication. When the communication is to be ended, the flow in FIG. 5 is completed, otherwise the flow proceeds to Step S6.

In Step S6, the master device 100 determines whether the configuration information acquiring operation is needed. If the configuration information acquiring operation is needed, the flow returns to Step S2 to repeat the steps up to Step S6 until it is determined to end the communication in Step S5. If the configuration information acquiring operation is not needed, the flow returns to Step S4 to repeat the steps up to Step S6 until it is determined to end the communication in Step S5.

The case where the configuration information acquiring operation is needed is, for example, a case where the master device 100 is set to check at predetermined intervals whether a new slave device 200 is added to or an existing slave device 200 is removed from the network system 1 and each predetermined interval has elapsed.

The case where the configuration information acquiring operation is not needed is, for example, a case where the master device 100 is set to check at predetermined intervals whether a new slave device 200 is added to or an existing slave device 200 is removed from the network system 1 and each predetermined interval has not elapsed yet.

The network system 1 operates as described above.

Figure 8:
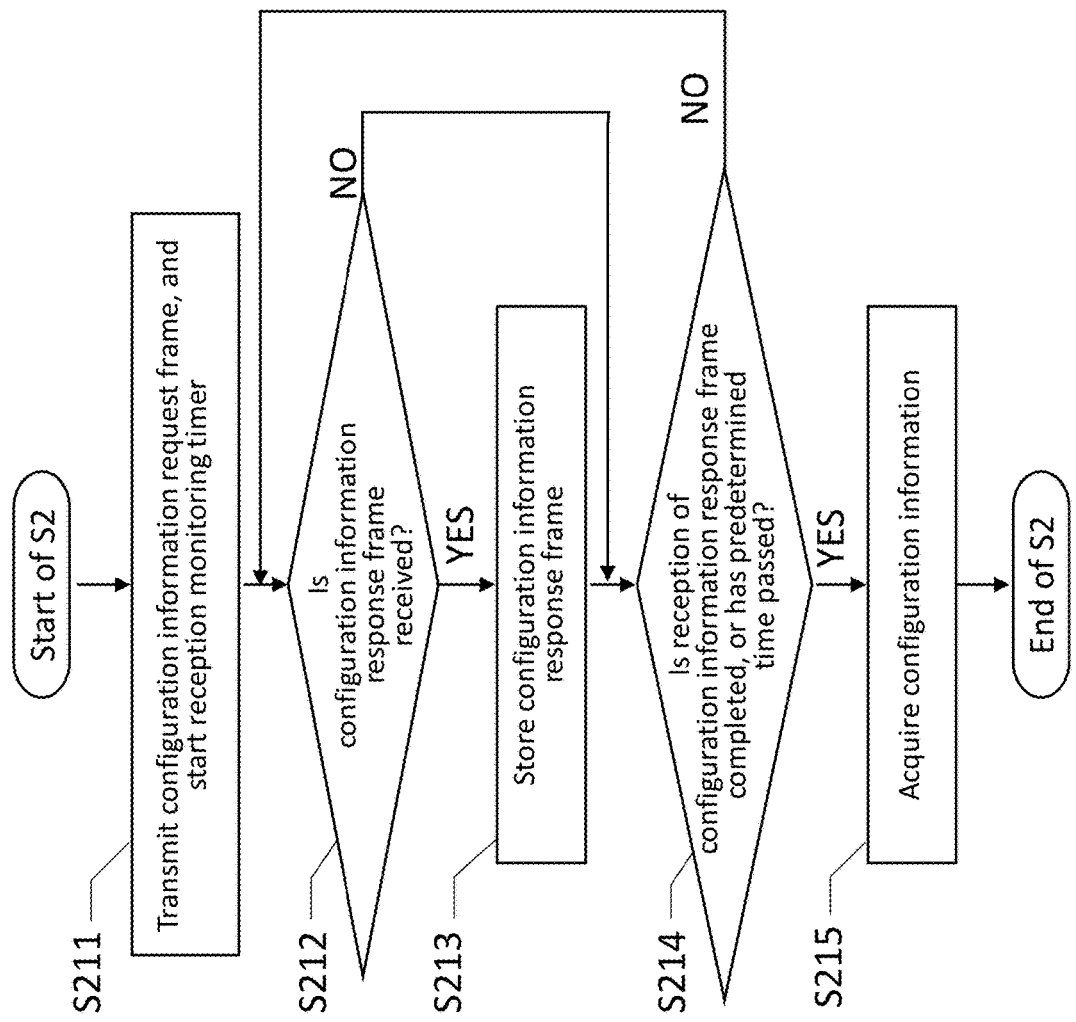
FIG. 8 is a flowchart showing the operation of the master device during configuration information acquisition in Embodiment 1.

Next, the details of each operation will be described. First, the operation of the master device 100 during the configuration acquisition performed in Step S2 of FIG. 5 will be described. FIG. 8 is a flowchart showing the operation of the master device 100 during the configuration information acquisition performed in Step S2 of FIG. 5.

In FIG. 5, when the instruction for starting the communication is given to the network system 1 in Step S1, the configuration information acquiring operation is started in Step S2, and the master device 100 starts the operation of the configuration information acquisition shown in FIG. 8.

First, in Step S211, the master device 100 transmits the configuration information request frame to the slave device 200a from the communication port 101 via the communication cable 3. At this time, the processing unit 120 of the master device 100 starts a reception monitoring timer (not shown). The reception monitoring timer, which is a function of the processing unit 120, measures the time that has elapsed since the configuration information request frame is transmitted in order to determine the completion of the reception of the configuration information response frame. In Step S211, the processing unit 120 acquires current time information from the time acquiring unit 132 and sets this time information as the time when the acquisition of the configuration information response frame is started to activate the reception monitoring timer.

After Step S211, in Step S212, the processing unit 120 determines whether a configuration information response frame is received. If it is received, in Step S213, the received information storing unit 111 stores the information of the acquired configuration information response frame.

After Step S213, in Step S214, the configuration information acquiring unit 121 checks whether the configuration information response frames, which are the responses to the configuration information request frame, have been received from all the slave devices 200 connected to the network system 1, or whether a predetermined time has passed since the reception monitoring timer was started.

The time elapsed since the reception monitoring timer was started is calculated as the difference between current time acquired by the processing unit 120 from the time acquiring unit 132 and the time when the acquisition of the configuration information response frames was started in Step S211. The predetermined time should be long enough to receive the configuration information response frames from all the slave devices 200 and is either pre-specified by the user or pre-stored to the master device 100. When the master device 100 has not yet received from all the slave devices 200 the configuration information response frames even after this predetermined time, the master device 100 determines that a time out has occurred.

When the master device 100 confirms that the reception of the configuration information response frames from all the slave devices 200 has not been completed and also that the measurement time of the reception monitoring timer has not passed the predetermined time, the flow returns to Step S212 to repeat the reception of the configuration information response frames. When the master device 100 confirms, in Step S214, that the reception of the configuration information response frames from all the slave devices 200 has been completed or that a time out has occurred since the measurement time of the reception monitoring timer has passed the predetermined time, the flow proceeds Step S215.

In Step S215, the configuration information acquiring unit 121 acquires the configuration information of the network system 1 based on the information of the configuration information response frames received up to Step S214 and stores it in the setting storing unit 112.

Through the operation of Step S211 to Step S215 described above, the master device 100 acquires the configuration information of the network system 1.

Figure 9:
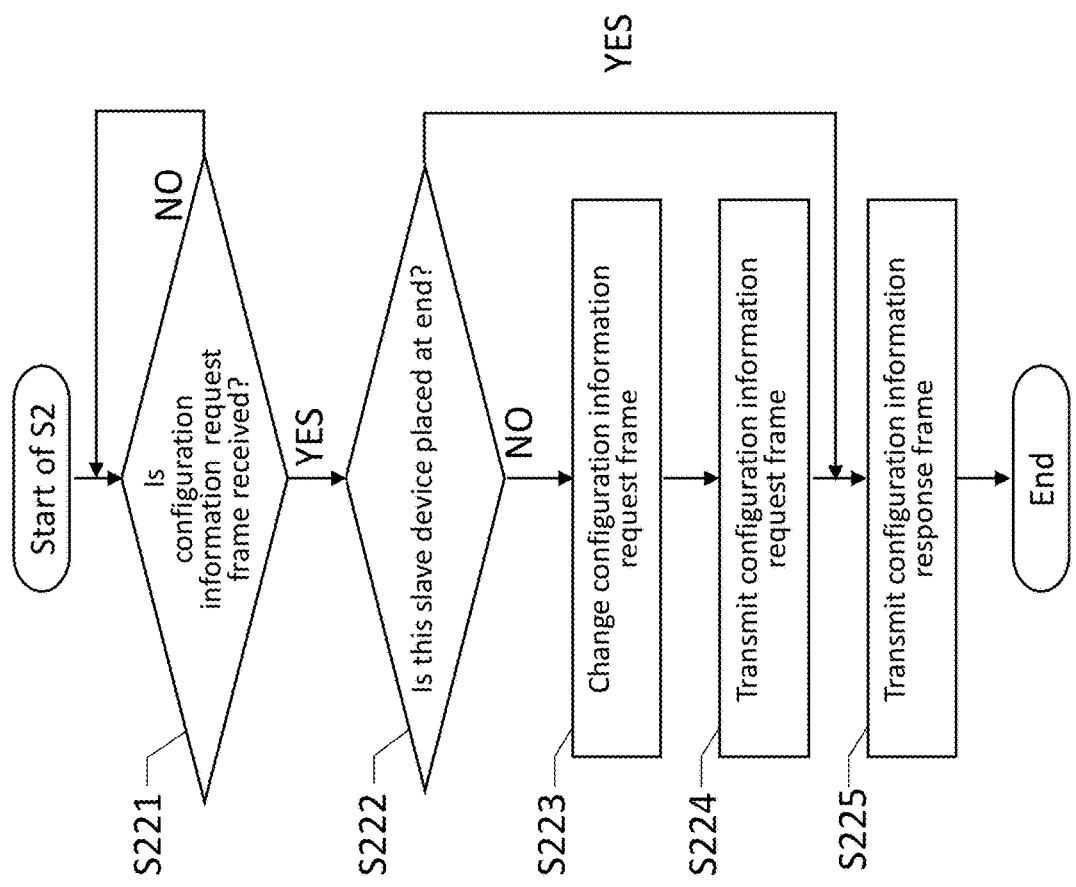
FIG. 9 is a flowchart showing the operation of the slave device during configuration information acquisition in Embodiment 1.

Next, the operation of the slave devices 200 during the configuration information acquisition will be described. FIG. 9 is a flowchart showing the operation of each slave device 200 during the configuration information acquisition performed in Step S2 of FIG. 5.

In Step S221, the communication port 201 on the master side acquires the configuration information request frame transmitted from the master device 100, and stores it in the received information storing unit 211. When the slave device 200 has received the configuration information request frame, the operation flow proceeds to Step S222.

In Step S222, the processing unit 220 of the slave device 200 determines whether the slave device 200 itself is the slave device 200e located at the end of the line connection in the network system 1. Whether it is the slave device 200e located at the end of the line connection can be determined, for example, by checking whether the communication cable 3 is connected to the communication port 202 on the end side or by referring to the configuration information and so on previously notified by the master device 100. When the slave device 200 determines that the slave device 200 itself is not the slave device 200e located at the end of the line connection, the flow proceeds to Step S223. When the slave device 200 determines that the slave device 200 itself is the slave device 200e located at the end of the line connection, the flow proceeds to Step S225.

In Step S223, the transmission information generating unit 222 of the slave devices 200 acquires and updates the configuration information request frame stored in the received information storing unit 211. The transmission information generating unit 222 stores the updated configuration information request frame in the transmission information storing unit 213.

Here, the configuration information request frame will be described with reference to FIG. 10. FIG. 10 is an explanatory drawing showing the information contained in the configuration information request frame. FIG. 10 shows, in chronological order from top to bottom, the information contained in the configuration information request frames that are initiated by the master device 100 and relayed down to the slave device 200e located at the end of the line connection. As shown in FIG. 10, the configuration information request frame contains the identification information of the transmission source device, the identification information of the transmission destination device, and the hop count when the master device 100 and the transmission source device communicate with each other. Specifically, the first row shows the configuration information request frame transmitted from the master device 100 to the slave device 200a. In this transmission, the hop count included in the configuration information request frame to be transmitted is zero. The second row shows the configuration information request frame to be transmitted from the slave device 200a to the slave device 200b. In this transmission, the hop count included in the configuration information request frame to be transmitted is one. Similarly, the third row shows the configuration information request frame to be transmitted from the slave device 200b to the slave device 200c; the fourth row shows the configuration information request frame to be transmitted from the slave device 200c to the slave device 200d; and the fifth row shows the configuration information request frame to be transmitted from the slave device 200d to the slave device 200e. As shown in FIG. 10, each slave device 200 adds one to the hop count of the received configuration information request frame when updating it in Step S223. For example, when the configuration information request frame with the information of the hop count zero is received from the master device 100, the slave device 200a updates the configuration information request frame by rewriting the identification information of the transmission source device to S1, which is the identification information of the slave device 200a itself, the identification information of the transmission destination device to S2, which is the identification information of the slave device 200b being the next destination of the transmission, and the hop count to one by adding one.

In Step S224, the updated configuration information request frame stored in the transmission information storing unit 213 is transmitted from the communication port 202 on the end side to another slave device 200. For example, the slave device 200a transmits, to the slave device 200b, the configuration information request frame with the identification information of the transmission source device, or S1, the identification information of the transmission destination device, or S2, and the updated hop count, or one.

In Step S225, the updated configuration information response frame stored in the transmission information storing unit 213 is transmitted from the communication port 201 on the master side.

Here, the configuration information response frame will be described with reference to FIG. 11. FIG. 11 is an explanatory drawing showing the information contained in the configuration information response frames. FIG. 11 shows, in chronological order from top to bottom, the information contained in the configuration information response frames that are transmitted from each of the slave devices 200 to the master device 100. As shown in FIG. 11, each configuration information response frame contains the identification information of the transmission source device, the identification information of the transmission destination device, and the hop count when the master device 100 and the transmission source device communicate with each other.

The master device 100 can acquire the configuration information of the network system 1 by performing the operation from Step S221 to Step S225 described above with all the slave devices. When all the slave devices 200a to 200e that constitute the network system 1 have transmitted its configuration information response frame to the master device 100, the configuration information acquiring operation of the network system 1 is completed.

When the configuration information acquiring operation of the network system 1 is completed, the configuration information for the communication setting operation is stored in the master device 100. Here, the configuration information acquired by the master device 100 is shown in FIG. 12. FIG. 12 is an explanatory drawing showing the configuration information acquired by the master device 100 according to Embodiment 1. The configuration information acquiring unit 121 of the master device 100 can acquire, from the information of the configuration information response frames shown in FIG. 11, the identification information of each of the slave devices 200, and the hop count of each of the slave devices 200 when it communicates with the master device 100. The hop count when each of the slave devices 200 communicates with the master device 100 is the phase difference of each of the slave devices 200. Thus, the master device 100 can acquire the identification information of each of the slave devices 200 and the phase difference corresponding to the identification information of each of the slave devices 200, as shown in FIG. 12.

Figure 13:
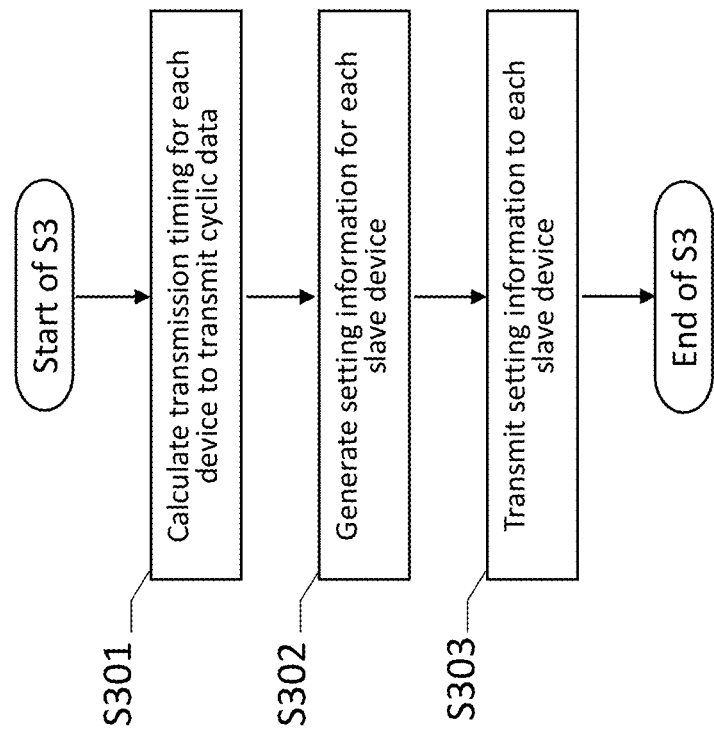
FIG. 13 is a flowchart showing the operation of the master device during the communication setting in Embodiment 1.

Next, the operation of the master device 100 during the communication setting in Step S3 will be described. FIG. 13 is a flowchart showing the operation of the master device 100 during the communication setting.

First, in Step S301, the transmission timing determining unit 122 of the master device 100 determines, based on the configuration information stored in the setting storing unit 112, the transmission timing for each device to transmit the cyclic data during the cyclic communication.

Here, the determination method for the transmission timing determining unit 122 to determine the transmission timing will be described in detail with reference to FIG. 14. FIG. 14 is a diagram illustrating the determination method of the transmission timing. In FIG. 14, the hop count of the communication and the phase difference of the transmission source device are acquired from the information included in the configuration information.

For each communication from a transmission source device to a transmission destination device, the transmission timing determining unit 122 calculates the remainder of the phase difference of the transmission source device divided by the hop count of the communication that can be performed by the transmission source device. The transmission timing determining unit 122 determines the transmission timing of the cyclic data of each of the slave devices 200 after calculating the remainder of the phase difference of each of the slave devices 200 divided by the hop count of the communication that can be performed by the slave device 200.

In a case where the transmission timing determining unit 122 is determining the transmission timings of a first slave device 200 and a second slave device 200 that each are about to perform separate communication of the same hop count, and then if the remainder of the phase difference of the first slave device 200 divided by the hop count and the remainder of the phase difference of the second slave device 200 divided by the hop count are the same, the transmission timing determining unit 122 determines the transmission timings of the first slave device and the second slave device so that their transmission timings will be the same. For example, in a case where the transmission timing determining unit 122 is determining the transmission timings of the slave device 200a and the slave device 200b that each are about to separately perform one-hop communication with another device, the remainder of the phase difference of the slave device 200a divided by the hop count is zero because the phase difference is one and the hop count is one and the remainder of the phase difference of the slave device 200b divided by the hop count is zero because the phase difference is two and the hop count is one. That is, the remainders with respect to the communication that these two devices are to perform are the same. Therefore, as shown in FIG. 14, the transmission timing determining unit 122 determines the transmission timings of the slave device 200a and the slave device 200b to be the same timing, which is $T_1$.

In a case where the transmission timing determining unit 122 is determining the transmission timings of the first slave device 200 and the second slave device 200 that each are about to separately perform communication of the same hop count, and then if the remainder of the phase difference of the first slave device 200 divided by the hop count and the remainder of the phase difference of the second slave device 200 divided by the hop count are not the same, the transmission timing determining unit 122 determines the transmission timings of the first slave device and the second slave device so that their transmission tasks will be performed at the different timings. For example, as shown in FIG. 14, the remainder of the phase difference divided by the hop count is zero when the slave device 200b with its phase difference two is about to perform communication of the hop count two, and then the transmission timing T2 is allotted this communication. When the slave device 200a with its phase difference one is about to perform communication of the hop count two, the remainder of the phase difference divided by the hop count is one, and then the transmission timing $T_3$ is allotted this communication.

When the first slave device 200 and the second slave device 200 are about to perform separate communication each with a different hop count from the other, the transmission timing determining unit 122 allots different transmission timings for their communication tasks. As shown in the rows of FIG. 14, for example, the communication with the hop count one is assigned the transmission timing $T_1$, and the communication with the hop count two to five is assigned the transmission timings other than the transmission timing $T_1$. Options of the transmission timings such as $T_1$ through $T_9$ to be assigned may be stored in the master device 100 in advance.

In Embodiment 1, as illustrated in FIG. 14, it is shown that the transmission timings are determined so that, in the communication with the same hop counts, all the devices with the same remainders of the phase differences divided by the respective hop counts will be assigned the same transmission timings. However, even if the transmission timings are determined so that a plurality of the devices will be assigned the same transmission timings by selecting at least one of the hop counts possible in the communication, the communication efficiency can be improved.

Also note that the transmission timing determining unit 122 only needs to determine the transmission timing of the cyclic data for each device so that the communication of the same hop counts will be performed at the same timings. In doing so, however, the transmission timing determining unit 122 does not necessarily need to use the remainders. For example, when determining the transmission timings of the first slave device and the second slave device to perform separate communication of the same hop count, the transmission timings of the first slave device and the second slave device may be set to the same timing when the phase difference subtracted by the hop count of the first slave device and the phase difference of the second slave device are the same. In this method as well, the result is that the communication of the same hop count is performed at the same time. This also can improve the communication efficiency. In this configuration, however, when the remainder of the phase difference of the first slave device divided by the hop count and the remainder of the phase difference of the second slave device divided by the hop count are different, if, of the first slave device and the second slave device, the transmission timing of the slave device whose remainder of the phase difference divided by the hop count is smaller than the other is set to be earlier than the transmission timing of the slave device whose remainder of the phase difference divided by the hop count is larger than the other, it is possible to further reduce the unused lines to improve the communication efficiency.

After Step S301, in Step S302, the setting information for each of the slave devices 200 is generated by using the determined transmission timing information. Specifically, the transmission information generating unit 123 generates the data in which the identification information and the setting information for each of the slave devices 200 are associated with each other and stores the generated data in the transmission information storing unit 113. Here, the contents of the setting information will be described based on FIG. 15. FIG. 15 is a diagram showing the contents of the setting information according to Embodiment 1. The information for the transmission of the cyclic data, that is, the identification information of the transmission source device, the transmission timing information, and the identification information of the transmission destination device are associated with each other and stored in the transmission information storing unit 113 as the setting information.

After Step S302, in Step S303, the master device 100 transmits the setting information stored in the transmission information storing unit 113 to the slave devices 200 via the communication port 101. As described above, the master device 100 determines the transmission timing for all the communication to be performed by all of the transmission source devices.

Figure 16:
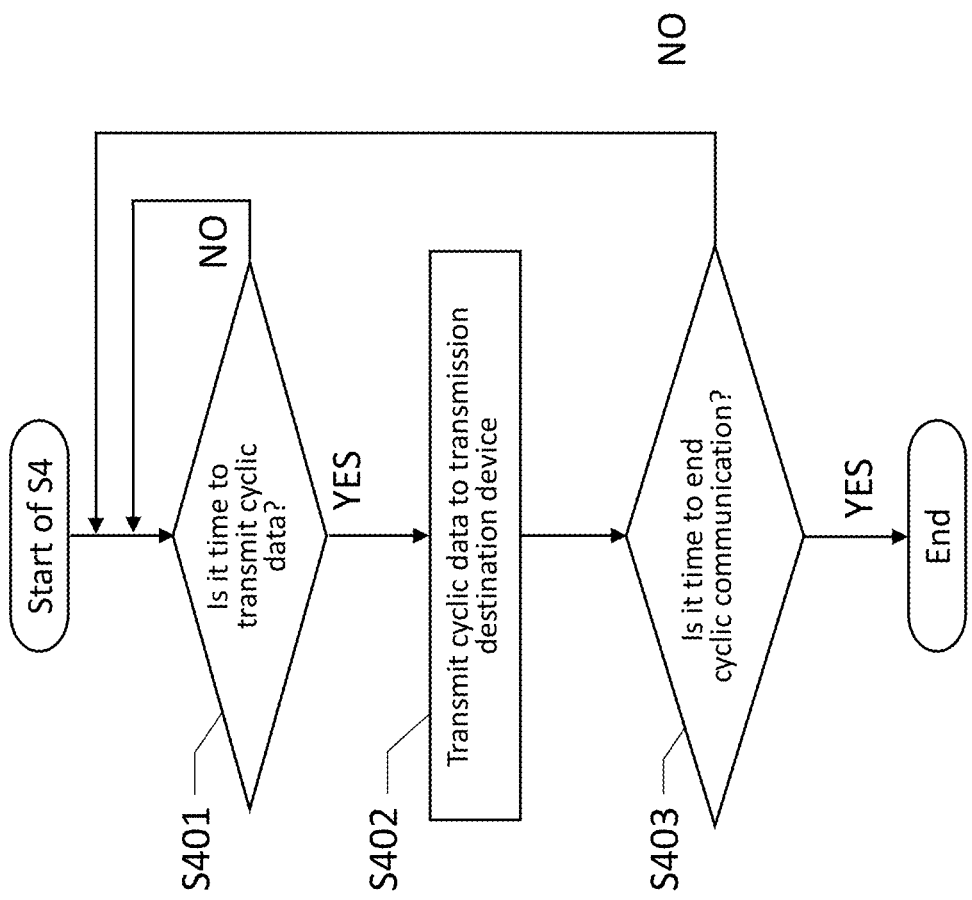
FIG. 16 is a flowchart showing the operation of the master device and the slave device during the cyclic communication in Embodiment 1.

Next, the operation of the master device 100 and the slave devices 200 during the cyclic communication in Step S4 will be described with reference to FIG. 16. FIG. 16 is a flowchart showing the operation of the master device 100 and each of the slave devices 200 during the cyclic communication.

When the communication setting operation of Step S3 in FIG. 5 is completed, each device starts the operation of the cyclic communication. In Step S401, the processing unit 120 of the master device 100 acquires the time information from the time acquiring unit 132 and determines whether it is time to transmit the cyclic data based on the setting information stored in the setting storing unit 112. Similarly, the processing unit 220 of each of the slave devices 200 acquires the time information from the time acquiring unit 232 and determines whether it is time to transmit the cyclic data based on the setting information stored in the setting storing unit 212. The master device 100 and the slave devices 200 repeat the determination in Step S401 until the transmission timing is reached. When the master device 100 and the slave devices 200 determine that it is the transmission timing, the flow proceeds to Step S402.

In Step S402, the processing unit 120 of the master device 100 and the processing unit 220 of each of the slave devices 200 transmit the cyclic data to the transmission destination device corresponding to the transmission timing based on the setting information. This cyclic data may be a numerical value or a character string.

In Step S403, the processing unit 120 of the master device 100 and the processing unit 220 of each of the slave devices 200 determine whether it is time to end the cyclic communication. Until the end time of the cyclic communication, the master device 100 and the slave devices 200 repeat the operations of Step S401 and Step S402.

In Step S403, the processing unit 120 of the master device 100 acquires the time information from the time acquiring unit 132 and determines whether it is time to end the cyclic communication operation based on the setting information stored in the setting storing unit 112. If it is the time, the master device 100 ends the cyclic communication operation. The processing unit 220 of each of the slave devices 200 acquires the time information from the time acquiring unit 232 and determines whether it is time to end the cyclic communication operation based on the setting information stored in the setting storing unit 212. If it is the time, the slave device 200 ends the cyclic communication operation.

Here, when all the devices are to share the cyclic data during the cyclic communication in the network system 1 that includes the master device 100 and the plurality of slave devices 200, the effects of the master device 100 and the communication method according to Embodiment 1 for the improvement of the line usage rate will be described.

Figure 17:
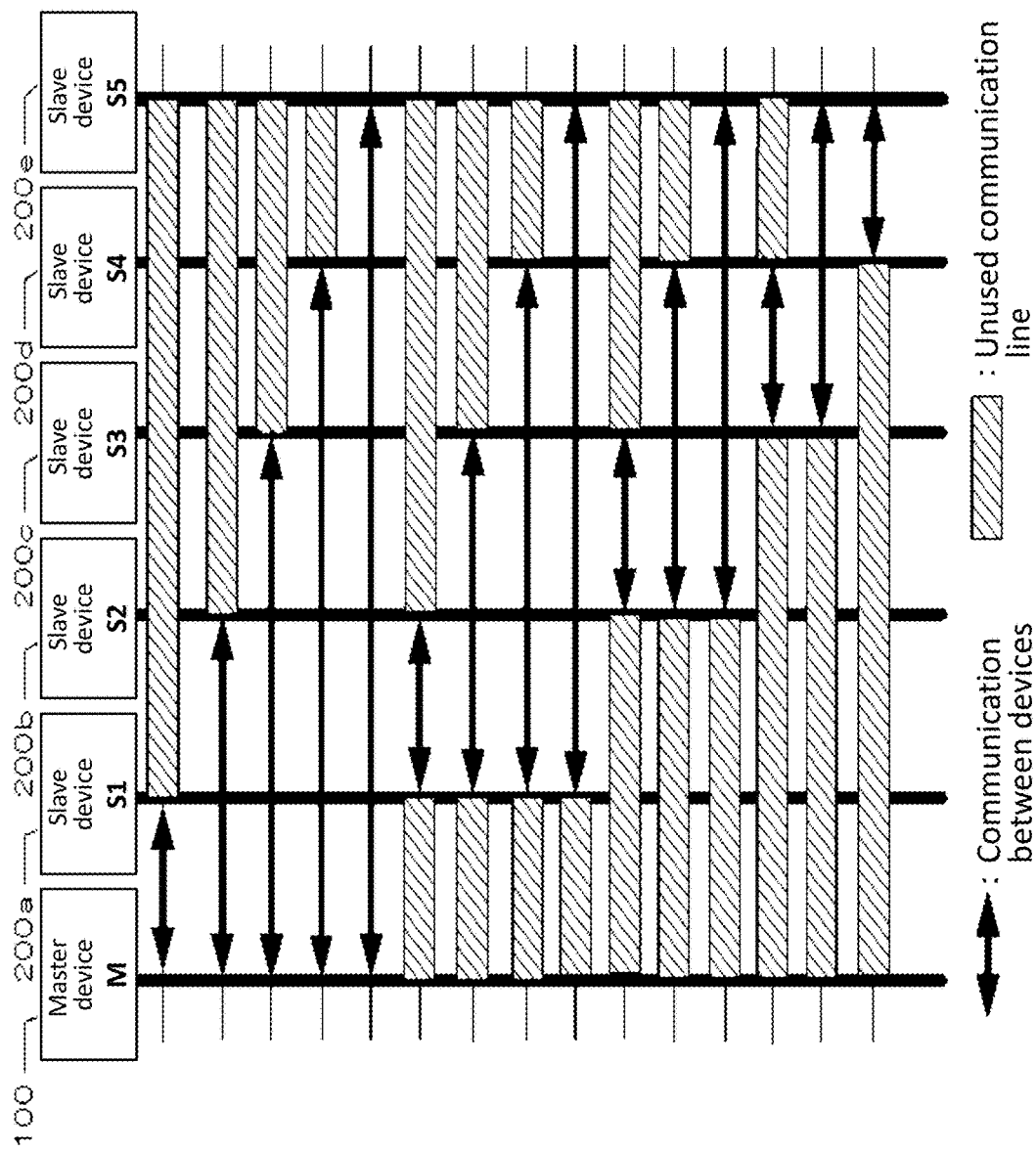
FIG. 17 is a sequence diagram showing an example of the cyclic communication when the communication method according to Embodiment 1 is not applied.

FIG. 17 is a sequence diagram showing an example of the cyclic communication when the communication method according to Embodiment 1 is not applied. In FIG. 17, the arrows show the communication between the devices. The communication slots assigned to the respective combinations of devices are shown in chronological order from top bottom. In each cycle in which the communication shown by the arrow is performed, the shaded areas show the lines that are not in use for the communication. As shown in FIG. 17, the system without the communication devices according to Embodiment 1 has lots of unused lines. For example, during the cycle when the master device 100 and the slave device S1 are in communication, the lines from the slave device S1 to the slave device S5 are not in use.

Figure 18:
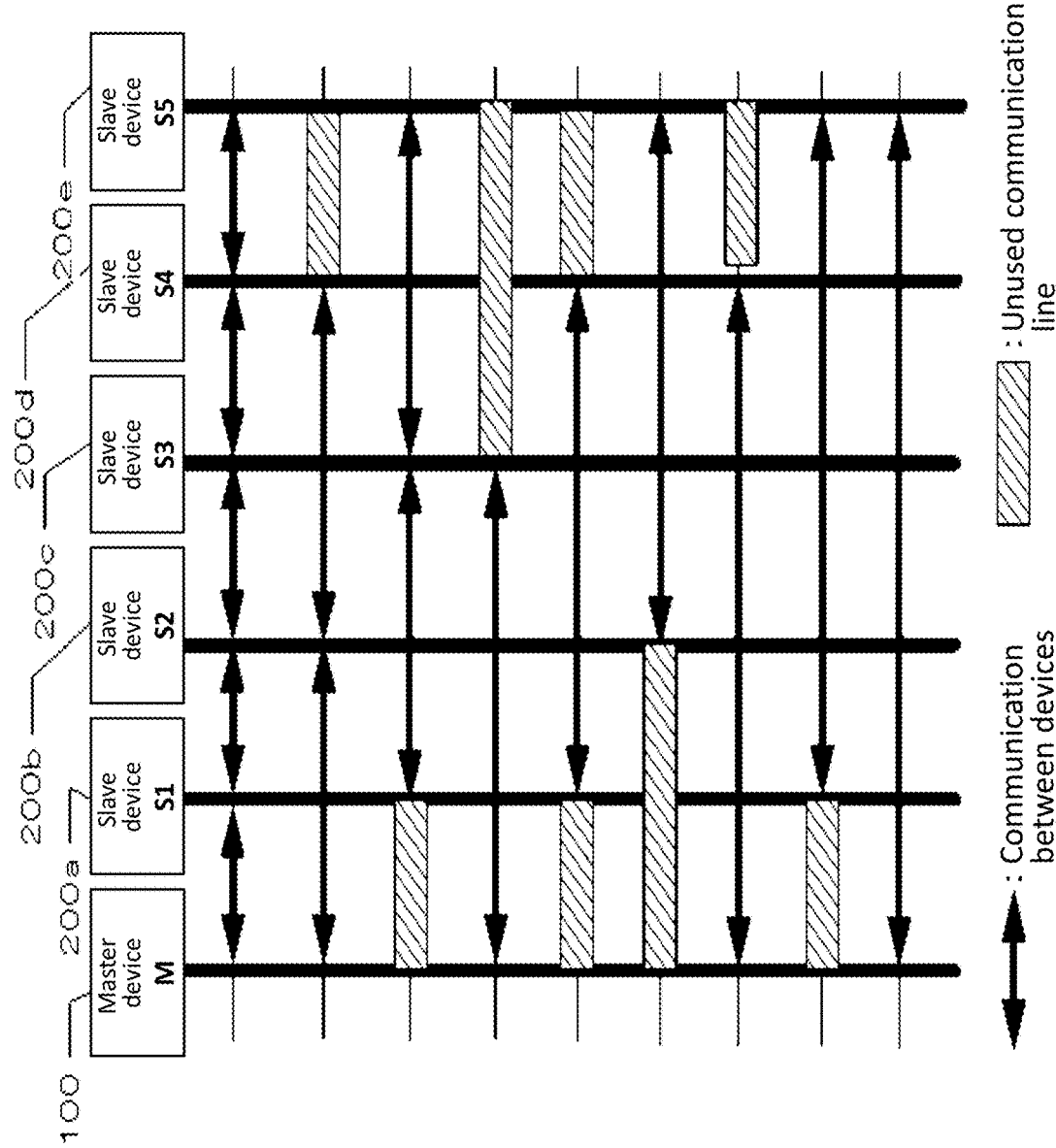
FIG. 18 is a sequence diagram showing an example of the cyclic communication when the communication method according to Embodiment 1 is applied.

In contrast, FIG. 18 is a sequence diagram showing the cyclic communication when the communication method according to Embodiment 1 is applied to the network system 1 with the same configuration as in FIG. 17. As in FIG. 17, the arrows show the communications between the devices and the shaded areas show the lines that are not in use during the communications shown by the arrows. The master device 100 according to Embodiment 1 determines the transmission timings of the cyclic data to be set to the slave devices 200 so that the plurality of slave devices 200 will perform the communication of the same hop count at the same timing. Therefore, in the cycle during which the master device 100 and a certain slave device 200 is in one-to-one communication, communications are allotted to unused lines between other devices. Therefore, from the comparison of the numbers of the unused lines between FIG. 17 and FIG. 18 in the time period from the start of communication to the completion of all communication, it is understood that the number of unused lines is lower when the communication method according to Embodiment 1, shown in FIG. 18, is applied. Thus, the application of the communication method according to Embodiment 1 reduces the number of unused lines when the distances between the devices communicating to share the cyclic data are short.

In addition, in the communication of the same hop count, if the communication takes the same unit of time, the time required to complete the cyclic communication is shorter by six time units in the cyclic communication shown in FIG. 18, to which the communication method according to Embodiment 1 is applied, than in the cyclic communication shown in FIG. 17, to which the communication method according to Embodiment 1 is not applied. This is achieved by the improvement of utilization of the lines. That is, the application of the communication method according to Embodiment 1 will shorten also the time to complete the communication cycles. The shorter time to complete the communication cycles contributes to suppress the increase in the communication cycles even when the number of devices in the network system 1 increases. This leads to high-speed communication in a large-scale network system 1 with a large number of devices.

As described so far, when performing the communication to share the cyclic data, the master device 100 determines the transmission timing of the cyclic data to be set to each of the slave devices 200 based on the phase difference of each of the slave devices 200 and the hop count determined depending on the number of slave devices 200 to be relayed so that the plurality of slave devices 200 will perform the communication of the same hop count at the same timings. As a result, the usage rate of the lines is improved, and the communication efficiency of the network system 1 is improved.

Figure 19:
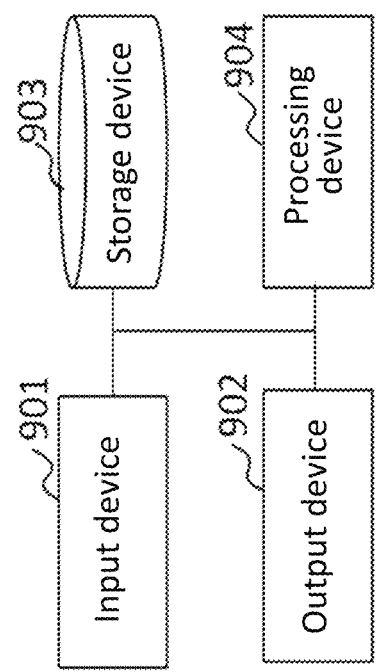
FIG. 19 is a hardware configuration diagram of the master device and the slave device according to Embodiment 1.

Next, the hardware configuration of the master device 100 and the slave devices 200 according to Embodiment 1 will be described with reference to FIG. 19. FIG. 19 is a hardware configuration diagram of the master device 100 and the slave devices 200 according to Embodiment 1. The master device 100 and the slave devices 200 each include an input device 901, an output device 902, a storage device 903, and a processing device 904.

The input device 901 is an interface included in each of the communication port 101 of the master device 100 and the communication ports 201 and 202 of the slave devices 200, to receive the information inputted. This interface works with both wired communication networks using LAN cables or coaxial cables, and wireless communication networks using wireless communication technologies.

The output device 902 is an interface included in the communication port 101 of the master device 100 and the communication ports 201 and 202 of each of the slave devices 200, to output the information therefrom. This network may be a wired communication network using LAN cables or coaxial cables or a wireless communication network using wireless communication technologies.

The storage device 903 is an information storing device included in the storing unit 110 of the master device 100 and the storing unit 210 of each of the slave devices 200. Examples of the storage device 903 include a non-volatile or volatile semiconductor memory such as RAM, ROM, and a flash memory, as well as a magnetic disk, a flexible disk, an optical disk, and a compact disk.

The processing device 904 is included in the processing unit 120 and the control unit 130 of the master device 100, and the processing unit 220 and the control unit 230 of each of the slave devices 200. The processing device 904 may be dedicated hardware or a Central Processing Unit (CPU) to execute a program stored in the storage device 903.

The processing device 904 as dedicated hardware is, for example, a single circuit, a composite circuit, a programed processor, a parallel programed processor, an ASIC, an FPGA, or a combination thereof.

The functions of the processing device 904 as a CPU are realized by software, firmware, or the combination thereof. The software and the firmware are written as a program and stored in the storage device 903. The processing device 904 realizes the functions of each unit by reading and executing the program stored in the storage device 903.

The functions of the processing device 904 may be realized partly by the hardware and partly by the software or the firmware.

For example, the control unit 130 of the master device 100 may be configured as dedicated hardware and the processing unit 120 thereof may be configured as a CPU executing the program stored in the storage device 903 to realize the functions of the master device 100.

Thus, the functions of the processing device 904, described above, can be realized by hardware, software, firmware, or the combination thereof.

As described so far, according to the master device 100 and the communication method of this disclosure, when performing the communication to share the cyclic data, the master device 100 determines the transmission timing of the cyclic data to be set to each of the slave devices 200 based on the phase difference of each of the slave devices 200 and the hop count determined depending on the number of slave devices 200 to be relayed so that the plurality of slave devices 200 will perform the communication of the same hop count at the same timings. As a result, the usage rate of the lines is improved, and the communication efficiency of the entire network system 1 is improved.

DESCRIPTION OF SYMBOLS

1 network system
3 communication cable
100 master device
101 communication port
110 storing unit
111 received information storing unit
112 setting storing unit
113 transmission information storing unit
120 processing unit
121 configuration information acquiring unit
122 transmission timing determining unit
123 transmission information generating unit
130 control unit
131 transmission control unit
132 time acquiring unit
200 slave device
201 communication port
202 communication port
210 storing unit
211 received information storing unit
212 setting storing unit
213 transmission information storing unit
220 processing unit
221 setting information acquiring unit
222 transmission information generating unit
230 control unit
231 transmission control unit
232 time acquiring unit
901 input device
902 output device
903 storage device
904 processing device

The invention claimed is:

1. A master device that is connected with a plurality of slave devices by communication cables and is included in a network system to communicate while sharing cyclic data, the master device comprising:
    configuration information acquiring circuitry to acquire a phase difference of each of the slave devices determined based on a number of other slave devices to be relayed when the each slave device communicates with the master device; and
    transmission timing determining circuitry to calculate a hop count from a number of other slave devices to be relayed when the each slave device communicates with the master device or another slave device based on the phase difference acquired by the configuration information acquiring circuitry and to determine a transmission timing for each slave device to transmit the cyclic data in such a way that communications with a same hop count are performed at a same timing by the plurality of slave devices using the communication cables each connecting different pairs of the slave devices.

2. The master device according to claim 1, wherein, in a case of determining transmission timings of a first slave device and a second slave device that perform communications of the same hop count out of the plurality of slave devices, the transmission timing determining circuitry determines the transmission timings of the first slave device and the second slave device so as to be a same timing when the phase difference subtracted by the hop count of the first slave device and the phase difference of the second slave device are the same.

3. The master device according to claim 2, wherein, in the case of determining the transmission timings of the first slave device and the second slave device that perform communications of the same hop count out of the plurality of slave devices, when a remainder of the phase difference of the first slave device divided by the hop count and a remainder of the phase difference of the second slave device divided by the hop count are different, the transmission timing determining circuitry determines the transmission timings of the first slave device and the second slave device in such a way that, of the first slave device and the second slave device, the transmission timing of the slave device whose remainder of the phase difference divided by the hop count is smaller than that of the other is set to be earlier than the transmission timing of the slave device whose remainder of the phase difference divided by the hop count is larger.

4. The master device according to claim 3, further comprising a communication port from which a configuration information request frame is transmitted to the slave devices, the configuration information request frame being a request for configuration information necessary for communications with the slave devices, wherein the configuration information acquiring circuitry acquires the phase difference from the configuration information contained in a configuration information response frame being a response to the configuration information request frame.

5. The master device according to claim 2, further comprising a communication port from which a configuration information request frame is transmitted to the slave devices, the configuration information request frame being a request for configuration information necessary for communications with the slave devices, wherein the configuration information acquiring circuitry acquires the phase difference from the configuration information contained in a configuration information response frame being a response to the configuration information request frame.

6. The master device according to claim 1, wherein, in a case of determining transmission timings of a first slave device and a second slave device that perform communications of the same hop count out of the plurality of slave devices, the transmission timing determining circuitry determines the transmission timings of the first slave device and the second slave device so as to be a same timing when a remainder of the phase difference divided by the hop count of the first slave device and a remainder of the phase difference divided by the hop count of the second slave device are the same.

7. The master device according to claim 6, further comprising a communication port from which a configuration information request frame is transmitted to the slave devices, the configuration information request frame being a request for configuration information necessary for communications with the slave devices, wherein the configuration information acquiring circuitry acquires the phase difference from the configuration information contained in a configuration information response frame being a response to the configuration information request frame.

8. The master device according to claim 1, further comprising a communication port from which a configuration information request frame is transmitted to the slave devices, the configuration information request frame being a request for configuration information necessary for communications with the slave devices, wherein the configuration information acquiring circuitry acquires the phase difference from the configuration information contained in a configuration information response frame being a response to the configuration information request frame.

9. The master device according to claim 1, wherein the master device and the plurality of slave devices all communicate within one communication cycle to share the cyclic data.

10. The master device according to claim 1, wherein the master device and all of the plurality of slave devices are wired by the communication cables in a line-shaped connection.

11. The master device according to claim 10, wherein each of the plurality of slave devices is connected to the master device in the line-shaped connection in order of proximity to the master device.

12. A communication method for a network system including a plurality of slave devices and a master device connected with the plurality of slave devices by communication cables to communicate with the slave devices while sharing cyclic data, the method comprising:
calculating a phase difference of each of the slave devices determined based on a number of other slave devices to be relayed when the each slave device communicates with the master device and a hop count from a number of other slave devices to be relayed when the each slave device communicates with the master device or another slave device; and
determining a transmission timing for each slave device to transmit the cyclic data in such a way that communications with a same hop count are performed at a same timing by the plurality of slave devices using the communication cables each connecting different pairs of the slave devices.

* * * * *